US006961155B2

(12) United States Patent
Sakaguchi

(10) Patent No.: US 6,961,155 B2
(45) Date of Patent: Nov. 1, 2005

(54) IMAGE READING APPARATUS, DEFAULT VALUE ADJUSTING METHOD OF IMAGE READING APPARATUS, AND CHART ORIGINAL

(75) Inventor: Yasunobu Sakaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 97 days.

(21) Appl. No.: 10/366,396

(22) Filed: Feb. 14, 2003

(65) Prior Publication Data

US 2003/0164992 A1 Sep. 4, 2003

Related U.S. Application Data

(62) Division of application No. 09/376,348, filed on Aug. 18, 1999, now Pat. No. 6,631,013.

(30) Foreign Application Priority Data

Aug. 18, 1998 (JP) ............................................ 10-231454

(51) Int. Cl.$^7$ ............................ H04N 1/04; H04N 1/047
(52) U.S. Cl. ....................... 358/475; 358/474; 358/486; 358/487; 358/406
(58) Field of Search ................................. 358/406, 504, 358/486, 488, 475, 474, 497, 494, 482, 483, 473, 3.26, 505, 509, 487, 506; 399/9, 31, 14–16; 355/133; 250/234–236, 208.1, 559.39; 382/312, 318, 313

(56) References Cited

U.S. PATENT DOCUMENTS

| | | | |
|---|---|---|---|
| 5,394,205 A | 2/1995 | Ochiai et al. | ............... 353/101 |
| 6,175,429 B1 | 1/2001 | Nagaharu et al. | ........... 358/475 |
| 6,195,182 B1 | 2/2001 | Kunishige | ................... 358/487 |
| 6,229,629 B1 * | 5/2001 | Tsai | ........................... 358/486 |
| 6,339,483 B1 | 1/2002 | Hoshino et al. | ............ 358/487 |
| 6,404,515 B1 | 6/2002 | Onda et al. | ................. 358/474 |
| 6,498,339 B1 * | 12/2002 | Kamisuwa | .................. 250/234 |
| 6,515,771 B1 * | 2/2003 | Sato | .......................... 358/3.26 |

FOREIGN PATENT DOCUMENTS

| | | | | |
|---|---|---|---|---|
| JP | 56-14770 | | 2/1981 | |
| JP | 59-90458 | | 5/1984 | |
| JP | 63-13571 | | 1/1988 | |
| JP | 05072492 A | * | 3/1993 | ........... G02B/26/10 |

* cited by examiner

*Primary Examiner*—Cheukfan Lee
(74) *Attorney, Agent, or Firm*—Sughrue Mion, PLLC

(57) ABSTRACT

A chart original in which two or more patterns are disposed so as to be separated at predetermined intervals and are symmetric with respect to a second imaginary line which is orthogonal to a first imaginary line. Each of the patterns is formed from a first line segment, which is orthogonal to the first imaginary line, and two second line segments, which are disposed at opposite positions with respect to the first line segment so as to intersect the first line segment. Each of the patterns intersect the first imaginary line at three points.

6 Claims, 15 Drawing Sheets

FIG. 13

MAGNIFICATION CALIBRATION RESULTS

LENS ID NO. ######

LENS FOCUSING
POINT DISTANCE ##. ##mm

|  | CONJUGATE LENGTH MOTOR | LENS MOTOR | ACTUAL IMAGE FORMATION MAGNIFICATION |
|---|---|---|---|
| 0.7 TIMES  PLANNED VALUE | #### | #### |  |
| ACTUAL MEASURED VALUE | #### | #### | #.### |
| 1.0 TIMES  PLANNED VALUE | #### | #### |  |
| ACTUAL MEASURED VALUE | #### | #### | #.### |
| OFFSET PULSES | #.#### | #.#### |  |
| POSITION RESOLUTION |  |  |  |

OK

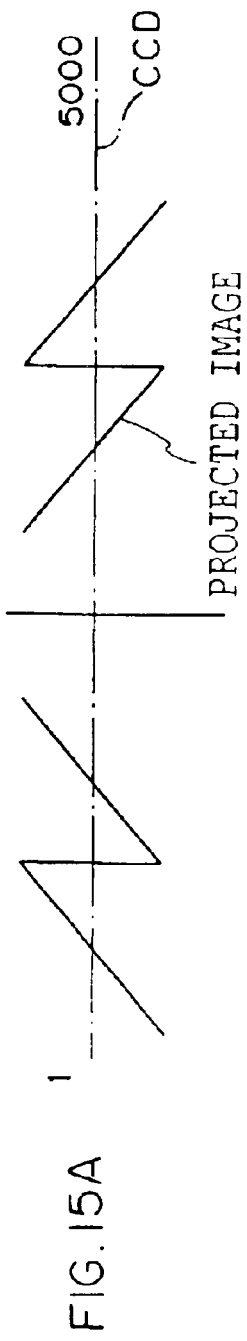
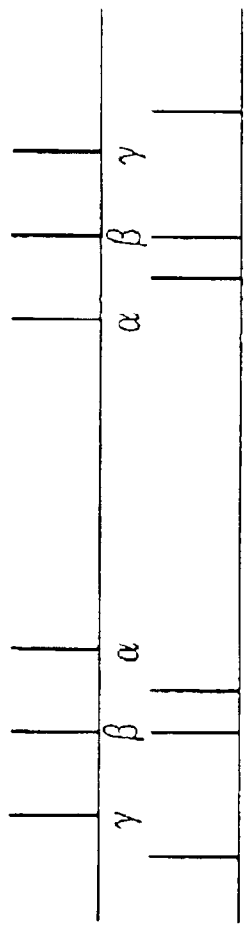
FIG.15A
FIG.15B
FIG.15C
FIG.15D
FIG.15E
FIG.15F

IMAGE READING APPARATUS, DEFAULT VALUE ADJUSTING METHOD OF IMAGE READING APPARATUS, AND CHART ORIGINAL

This is a divisional of application Ser. No. 09/376,348 filed Aug. 18, 1999, now U.S. Pat. No. 6,631,013; the disclosure of which is incorporated herein by reference.

BACKGROUND OF THE INVENTION

1. Field of the Invention

The present invention relates to an image reading apparatus, a default value adjusting method of an image reading apparatus, and a chart original, and in particular, relates to an image reading apparatus having default values of a resolution of a pulse motor that moves a lens unit or the like of the image reading apparatus, a default value adjusting method of an image reading apparatus which adjusts default values, and a chart original which is directly used in an embodiment of the default value adjusting method of an image reading apparatus.

2. Description of the Related Art

Japanese Patent Application Laid-Open (JP-A) No. 5-281631 discloses a method for adjusting a position of a zoom ring which adjusts the magnification of a zoom lens and a position of a focusing ring which adjusts the focusing point of the zoom lens, in accordance with the size of a photographic print. In this method, a default value of the position of the zoom ring and a default value of the position of the focusing ring, in accordance with the size of a photographic print, are recorded in advance in a memory. On the basis of these default values, the position of the zoom ring and the position of the focusing ring are controlled, an image of a photographic print is image-formed (focused) at an image sensor, and the image thus image-formed at the image sensor is displayed on a preview display apparatus. In cases in which the image displayed on the preview display apparatus is not suitable for the display screen, an operator adjusts the respective positions of the zoom ring and the focusing ring such that the image displayed on the preview display apparatus becomes suitable for the display screen, while observing the image displayed on the preview display apparatus. The already stored default value is changed to the value obtained by the adjustment of the zoom lens. As a result, since an adjusted default value in accordance with each of the photographic print sizes thereafter is used, it is not necessary to adjust the zoom lens in accordance with the size of each photographic print. The burden on the operator in terms of time and labor can be reduced.

However, in the conventional adjusting method described above, although the burden on the operator in terms of time and labor is reduced after the default value is adjusted, however, during adjustment, much time is required, since the default value must be adjusted for each size of the photographic film while viewing the display screen.

SUMMARY OF THE INVENTION

The present invention has been devised to overcome the above problems. An object of the present invention is to provide an image reading apparatus and a default value adjusting method of an image reading apparatus which reduce the work involved in adjustment. Further, an object of the present invention is to provide a chart original which facilitates detection of positional offset between an original holding portion and an image reading element.

In order to achieve the above object, the image reading apparatus of the present invention comprises:

a reading section movable in an optical axis direction, said reading section including a lens unit which is movable in the optical axis direction, and an image reading element which is disposed at a focusing position of the lens unit and which via the lens unit reads an image of an original disposed at an original reading position;

first driving means for moving the lens unit in the optical axis direction in accordance with an inputted signal of a first pulse number;

second driving means for moving the reading section in the optical axis direction in accordance with an inputted signal of a second pulse number;

storing means for storing a first default value, which expresses an amount of movement corresponding to a unit pulse of the first moving means, and a second default value, which expresses an amount of movement corresponding to a unit pulse of the second moving means; and pulse number calculating means for calculating the first pulse number corresponding to a focusing magnification by using the first default value, inputting a signal of the first pulse number to the first driving means, calculating the second pulse number corresponding to the focusing magnification by using the second default value, and inputting a signal of the second pulse number to the second driving means.

It is preferable that the image reading apparatus of the present invention be provided with adjusting means which makes the pulse number calculating means calculate a first pulse number and a second pulse number which correspond to a predetermined set focusing magnification, and makes the pulse number calculating means input a signal of the first pulse number to the first driving means and input a signal of the second pulse number to the second driving means so that the lens unit and the reading section are moved, and thereafter, the adjusting means carries out autofocusing, in which the second driving means is driven so as to carry out focusing with respect to the original, and carries out magnification adjustment, in which the first driving means is driven such that an actual focusing magnification after autofocusing is carried out coincides with the set focusing magnification, until the actual focusing magnification becomes a value which is within a standard range with respect to the set focusing magnification, and the adjusting means adjusts the second default value on the basis of the second pulse number for when the actual focusing magnification becomes the value within the standard range with respect to the set focusing magnification and on the basis of a conjugate length for the set focusing magnification, and adjusts the first default value on the basis of the first pulse number for when the actual focusing magnification becomes the value within the standard range with respect to the set focusing magnification and on the basis of a distance from a principal point of the lens unit to the focusing position with respect to the set focusing magnification.

The adjusting means can adjust the second default value on the basis of a difference in the second pulse numbers with respect to two set focusing magnifications, each of the second pulse numbers being for when the actual focusing magnification becomes a value within the standard range for the respective set focusing magnification, and on the basis of a difference in conjugate lengths for the two set focusing magnifications, and the adjusting means can adjust the first default value on the basis of a difference in the first pulse numbers with respect to the two set focusing magnifications, each of the first pulse numbers being for when the actual focusing magnification becomes a value within the standard range for the respective set focusing magnification, and on the basis of a difference in distances with respect to the two set focusing magnifications each of the distances being from the principal point of the lens unit to a focusing position.

It is preferable that the image reading apparatus of the present invention be provided with positional offset detecting means for detecting positional offset between the image reading element and an original holding portion which holds the original at the original reading position, by reading, by using the image reading element, an image of an original located at the original reading position of the original holding portion.

In a default value adjusting method of an image reading apparatus of the present invention, the image reading apparatus comprises:

a reading section movable in an optical axis direction, the reading section including a lens unit which is movable in the optical axis direction, and an image reading element which is disposed at a focusing position of the lens unit and which via the lens unit reads an image of an original disposed at an original reading position;

first driving means for moving the lens unit in the optical axis direction in accordance with an inputted signal of a first pulse number;

second driving means for moving the reading section in the optical axis direction in accordance with an inputted signal of a second pulse number;

storing means for storing a first default value, which expresses an amount of movement corresponding to a unit pulse of the first moving means, and a second default value, which expresses an amount of movement corresponding to a unit pulse of the second moving means; and pulse number calculating means for calculating the first pulse number corresponding to a focusing magnification by using the first default value, inputting a signal of the first pulse number to the first driving means, calculating the second pulse number corresponding to the focusing magnification by using the second default value, and inputting a signal of the second pulse number to the second driving means, and the default value adjusting method comprising steps of:

making the pulse number calculating means calculate the first pulse number and the second pulse number which correspond to a predetermined set focusing magnification;

making the pulse number calculating means input the signal of the first pulse number to the first driving means and input the signal of the second pulse number to the second driving means so that the lens unit and the reading section are moved;

carrying out autofocusing, in which the second driving means is driven so as to carry out focusing with respect to the original, and carrying out magnification adjustment, in which the first driving means is driven such that an actual focusing magnification after autofocusing is carried out coincides with the set focusing magnification, until the actual focusing magnification becomes a value within a standard range with respect to the set focusing magnification; and adjusting the second default value on the basis of the second pulse number for when the actual focusing magnification becomes the value within the standard range with respect to the set focusing magnification and on the basis of a conjugate length for the set focusing magnification, and adjusting the first default value on the basis of the first pulse number for when the actual focusing magnification becomes the value within the standard range with respect to the set focusing magnification and on the basis of a distance from a principal point of the lens unit to the focusing position with respect to the set focusing magnification.

In the default value adjusting method of the image reading apparatus wherein the second default value is adjusted on the basis of a difference in the second pulse numbers with respect to two set focusing magnifications, each of the second pulse numbers being for when the actual focusing magnification becomes a value within the standard range for the respective set focusing magnification, and on the basis of a difference in conjugate lengths for the two set focusing magnifications, and the first default value is adjusted on the basis of a difference in first pulse numbers with respect to the two set focusing magnifications, each of the first pulse numbers being for when the actual focusing magnification becomes a value within the standard range for the respective set focusing magnification, and on the basis of a difference in distances with respect to the two set focusing magnifications each of the distances being from the principal point of the lens unit to a focusing position.

The chart original of the present invention is a chart original in which two or more patterns are disposed so as to be separated at predetermined intervals and so as to be symmetric with respect to a second imaginary line which is orthogonal to a first imaginary line, each of the patterns being formed from a first line segment, which is orthogonal to the first imaginary line, and two second line segments, which are disposed at opposite positions with respect to the first line segment so as to intersect the first line segment, and each of the patterns intersecting the first imaginary line at the three points.

In the present invention, the first pulse number corresponding to the focusing magnification is calculated by using the first default value. By inputting a signal of the first pulse number, the lens unit is moved in the optical axis direction by the first moving means. The second pulse number corresponding to the focusing magnification is calculated by using the second default value. By inputting a signal of the second pulse number, the reading section is moved in the optical axis direction by the second moving means. The image of the original, which is disposed at the focusing position of the lens unit and at the original reading position, is read by the image reading element via the lens unit.

In the present invention, when the default value is adjusted, the default value recorded in the storing means are used, the driving means are driven, and the lens unit and the reading section are thereby moved to positions corresponding to the set focusing magnification determined in advance. Thereafter, the second driving means is driven so as to be focussed with respect to the original, and the first driving means is driven such that an actual focusing magnification after autofocusing coincides with the set focusing magnification, until the actual focusing magnification becomes a value within a standard range with respect to the set focusing magnification.

Then, the movement amount corresponding to the unit pulse of the second driving means is calculated, based on the second pulse number of when the actual focusing magnification becomes a value within the standard range with respect to the set magnification, and based on the conjugate length with respect to the set focusing magnification. The second default value recorded in the storing means is changed to the thus calculated value. Further, the movement amount corresponding to the unit pulse of the first driving means is calculated, based on the first pulse number of when the actual focusing magnification becomes a value within the standard range with respect to the set magnification, and based on the distance from the principal point of the lens unit to the focusing position with respect to the setting focusing magnification. The first default value recorded in the storing means is changed to the thus calculated value. As a result, the respective planned positions of the lens unit and the reading section for the focusing magnification coincides with the respective actual positions.

In the present invention, default values can be adjusted using one set focusing magnification. However, the default values can be adjusted with further accuracy in using two set focusing magnifications, by adjusting the second default value on the basis of a difference in second pulse numbers with respect to two set focusing magnifications each of the second pulse numbers being for when the actual focusing magnification becomes a value within the standard range for the respective set focusing magnification and on the basis of a difference in conjugate lengths for the two set focusing magnifications, and adjusting the first default value on the basis of a difference in first pulse numbers with respect to the two set focusing magnifications, each of the first pulse numbers being for when the actual focusing magnification becomes a value within the standard range for the respective set focusing magnification and on the basis of a difference in distances with respect to the two set focusing magnifications each of the distances being from the principal point of the lens unit to the focusing position.

In the present invention, it is preferable to provide a positional offset detecting means for detecting positional offset between the image reading element and an original holding portion which holds the original at the original reading position, by reading, by using the image reading element, an image of an original located at the original reading position of the original holding portion.

The positional offset between the original holding portion and the image reading element can be detected by using the chart original of the present invention, in which two or more patterns are disposed so as to be separated at predetermined intervals and so as to be symmetric with respect to a second imaginary line which is orthogonal to a first imaginary line, each of the patterns being formed from a first line segment, which is orthogonal to the first imaginary line, and two second line segments, which are disposed at opposite positions with respect to the first line segment so as to intersect the first line segment, and each of the patterns intersecting the first imaginary line at the three points. The chart original of the present invention is disposed such that the first imaginary line is oriented in a direction corresponding to the direction in which the plural pixels of the image reading element are arrayed. By detecting the intervals between three points intersecting the direction in which the pixels are arrayed, the positional offset between the original holding portion and the image reading element can be corrected.

BRIEF DESCRIPTION OF THE DRAWINGS

FIG. 13 is a plan view illustrating a display screen when results of a completed magnification calibration are shown.

FIGS. 15A through 15F are explanatory diagrams for explaining principles of detection of an amount of positional offset by using N-shaped patterns.

DESCRIPTION OF THE PREFERRED EMBODIMENTS

Below, an explanation will be provided of an embodiment of the present invention while referring to the Figures.

Figure 1:
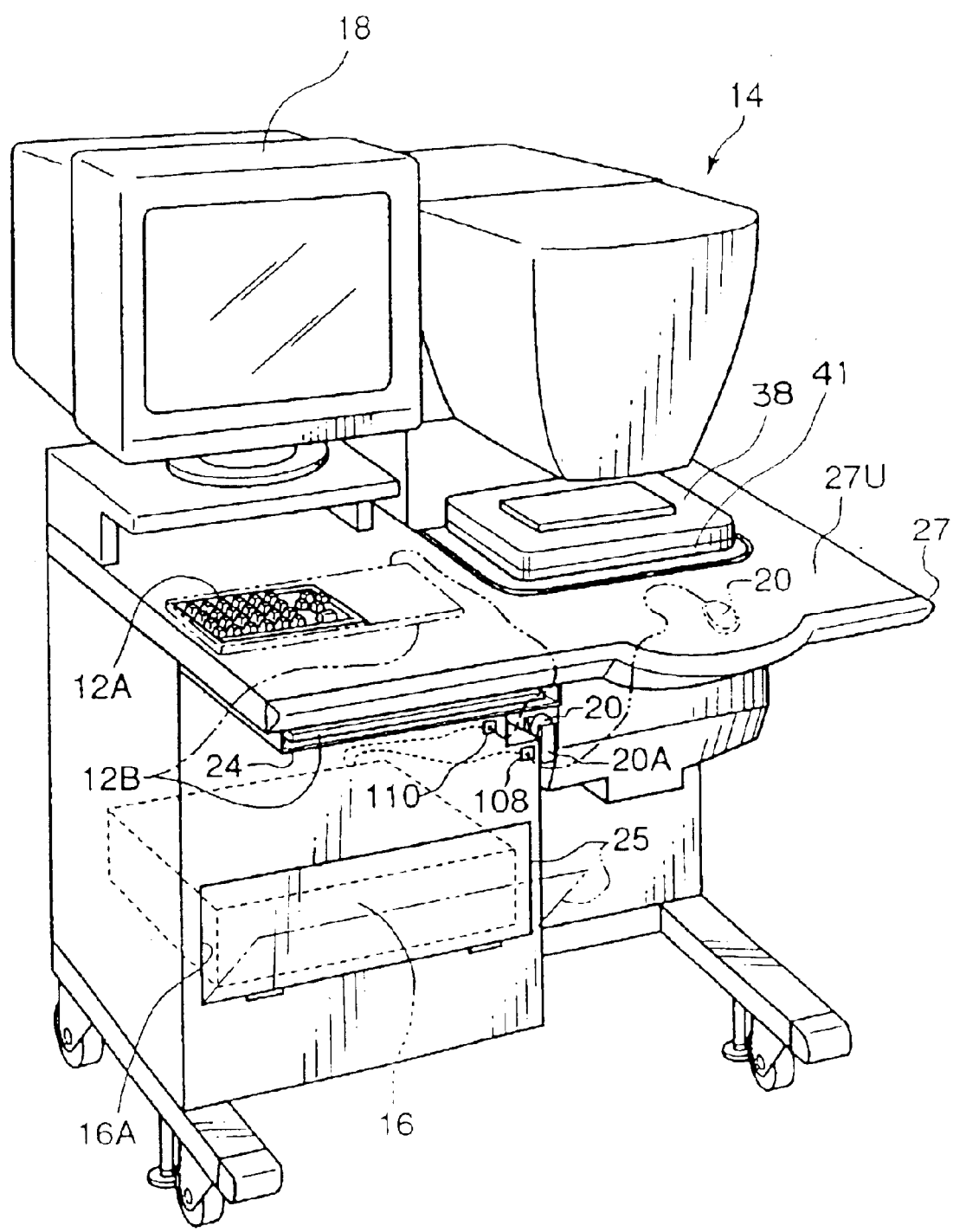
FIG. 1 is an exterior view of an image reading apparatus.

As illustrated in FIG. 1, a line CCD scanner 14 of an image reading apparatus of the present embodiment is provided with a work table 27 having disposed thereon: an image processing section 16 formed with a personal computer; a mouse 20 connected to the image processing section 16; two types of keyboards 12A, 12B connected to the image processing section 16; and a display 18 connected to the image processing section 16.

One of the keyboards, the keyboard 12A, is embedded in a work surface 27U of the work table 27. The other keyboard, the keyboard 12B, is contained within a tray 24 provided at a lower side of the work table 27. During use, the keyboard 12B is removed from the tray 24, and is placed on top of the keyboard 12A. At this time, a cord of the keyboard 12B is connected to a jack 110 connected to the image processing section 16, and used. During use of the keyboard 12B, data can not be input from the keyboard 12A.

A jack of the mouse 20 is inserted into a jack 108 provided at the work table 27, and is connected to the image processing section 16 via the jack 108. The mouse 20 is stored in a mouse holder 20A when not in use. During use, the mouse 20 is removed from the mouse holder 20A and is placed on the work surface 27U.

The image processing section 16 is stored inside a storage portion 16A provided at a lower side of the work table 27. An open-and-close hatch 25 is provided at an aperture portion of the storage portion 16A. Further, by opening the open-and-close hatch 25, the image processing section 16 can be removed.

The line CCD scanner 14 reads film images recorded on photographic film such as negative film or reversal film. For example, the line CCD scanner 14 can read as objects to be read images recorded on 135-size photographic film, 110-size photographic film, photographic film having a transparent magnetic layer formed thereon (240-size photographic film, i.e., so-called APS film), and 120-size and 220-size (Brownie size) photographic film. The line CCD scanner 14 reads with a line CCD the film images of the above-described objects to be read, and outputs image data.

The image processing section 16 carries out image processing such as various types of corrections or the like of image data input from the line CCD scanner 14, and outputs image data for recording, to an image outputting section that records images on printing paper using a laser (not shown).

Figure 2:
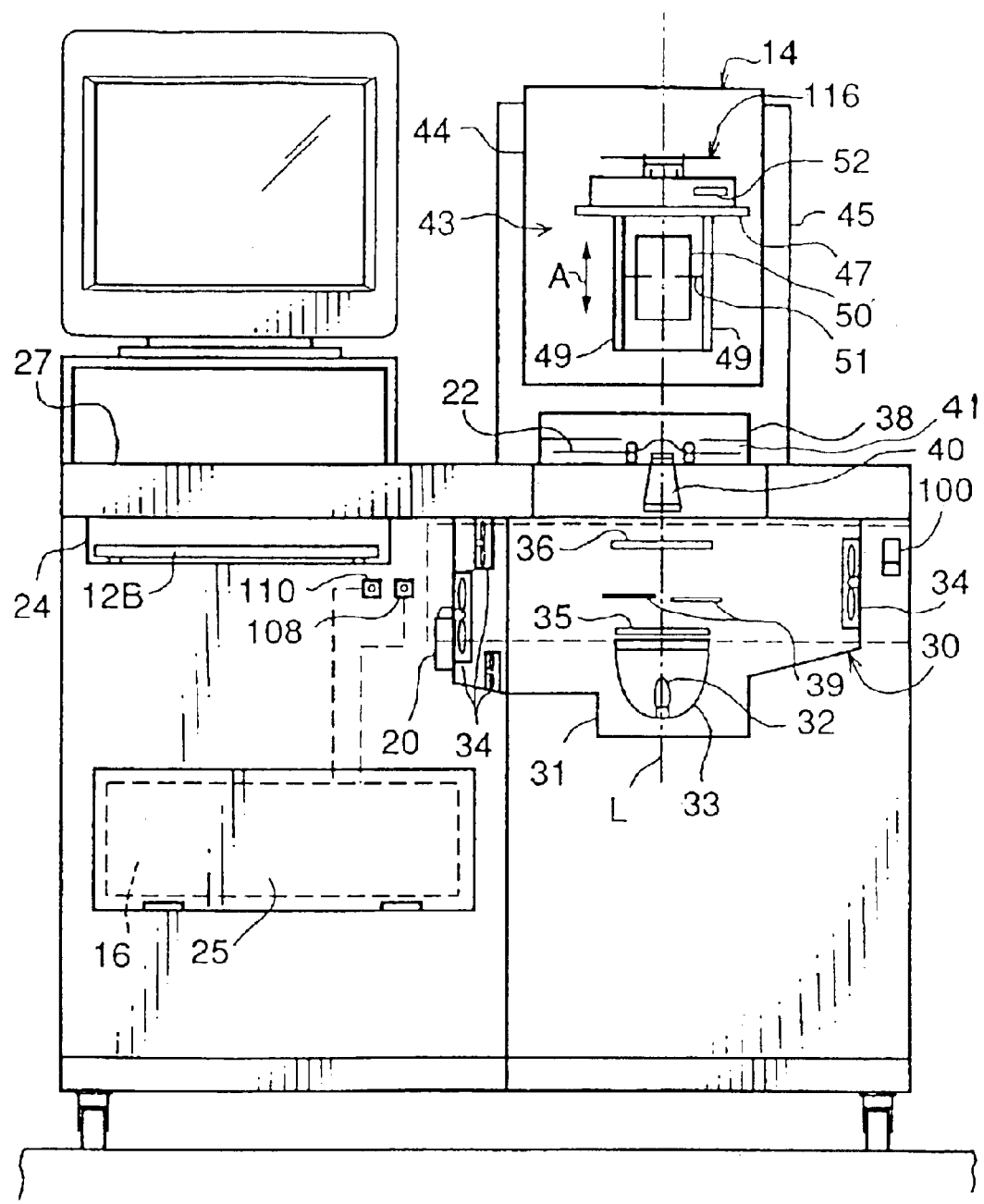
FIG. 2 is a cross-sectional front view of an optical system of the image reading apparatus.
Figure 3:
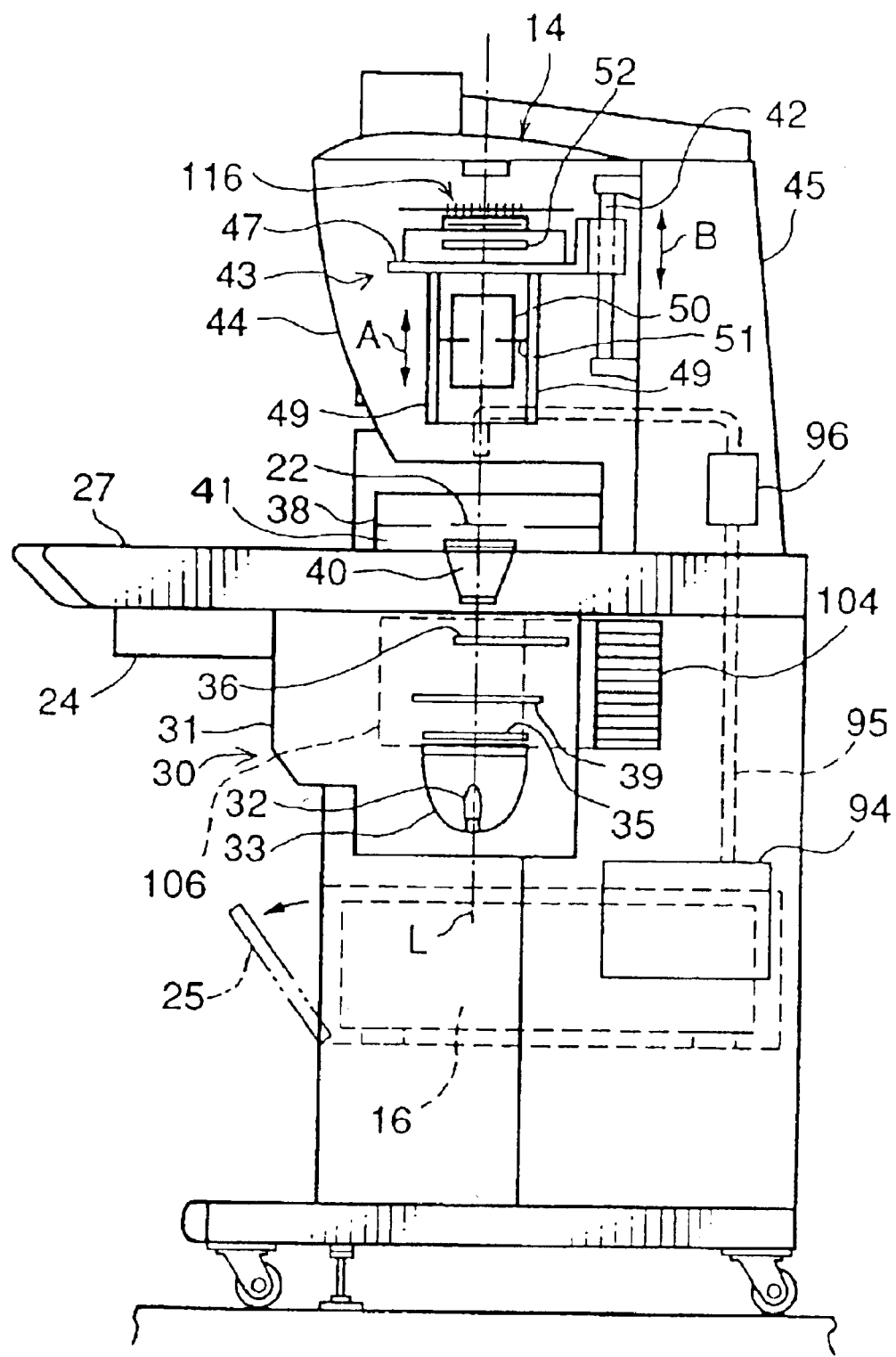
FIG. 3 is a cross-sectional side view of the optical system of the image reading apparatus.

As shown in FIGS. 2 and 3, an optical system of the line CCD scanner 14 is provided with: a light source section 30 disposed at a lower side of the work table 27; a diffusion box 40 supported at the work table 27 so as to be replaceable; a film carrier 38 set at the work table 27 so as to be replaceable; and a reading section 43 disposed at a side opposite to the light source section 30, with the work table 27 therebetween.

The light source section 30 is contained in a metal casing 31. Inside the casing 31, a lamp 32 comprised of a halogen lamp or a metal halide lamp or the like is disposed.

A reflector 33 is provided at a periphery of the lamp 32, and a portion of light emitted by the lamp 32 is reflected by the reflector 33, in a direction of the reading section 43. A plurality of fans 34 are provided at sides of the reflector 33. The fans 34 operate while the lamp 32 is lit, and prevent internal portions of the casing 31 from overheating.

At a light-reflecting side of the reflector 33, the following are provided, in the following order: an infrared-ray (IR)-cutting filter 35 that prevents the temperature of a photographic film 22 from rising by cutting light of wavelengths in the infrared range, thus improving reading accuracy; a stop 39 (diaphragm) that adjusts the amount of light from the lamp 32 and the amount of the reflected light from the reflector 33; and a turret 36 (see FIG. 4B as well) having fitted therein a balance filter 36N for negative film and a balance filter 36P for reversal film, which appropriately set a color composition of light reaching the photographic film 22 and the reading section 43, in accordance with the type of photographic film (negative film/reversal film).

Figure 4A:
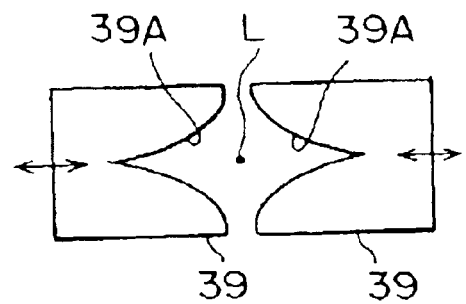
FIG. 4A is a plan view illustrating an example of a diaphragm.
Figure 4B:
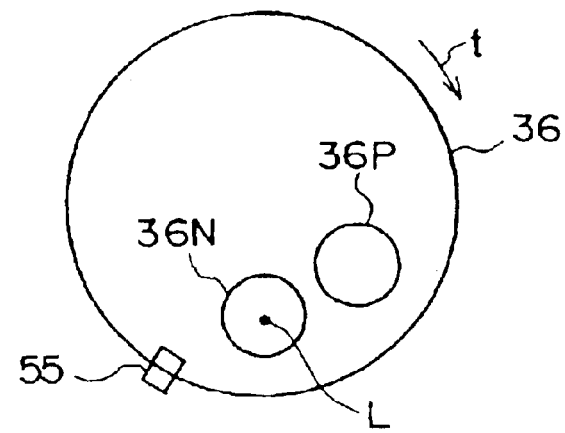
FIG. 4B is a plan view illustrating an example of a turret.

The stop 39 is formed with a pair of plates disposed having therebetween an optical axis L, such that the pair of plates can slide away from or toward each other. As illustrated in FIG. 4A, each of the pair of plates of the stop 39 has a notch 39A formed at one end thereof, from the one end of the plate towards the other end along a sliding direction, such that the area of the cross-section cut along the direction orthogonal to the sliding direction continuously changes. The plates are disposed such that respective sides of the plates having notch 39A formed therein face each other.

In the above-described structure, in order to ensure light of a predetermined color composition, one of the filter 36N and the filter 36P is positioned on the optical axis L in accordance with the type of photographic film, and light to be transmitted through the stop 39 is adjusted to predetermined amounts by the position of the stop 39.

The diffusion box 40 is formed such that towards upper portions thereof, namely, as the photographic film 22 is approached, a dimension of the diffusion box 40 decreases in the direction the photographic film 22, which is conveyed by the film carrier 38, is conveyed (see FIG. 2). A dimension of the diffusion box 40 increases (see FIG. 3) in the direction orthogonal to the direction the photographic film 22 is conveyed (i.e., in the direction of the width of the photographic film 22). The film carrier 38 is attached to a carrier mount 41. Further, a light diffusing plate (not illustrated) is attached to the diffusion box 40 at a light exiting side thereof. Although the diffusion box 40 is for 135-size photographic film, diffusion boxes (not shown) are prepared for photographic film of other sizes, and are used by carrying out replacement in accordance with the size of a photographic film.

Towards the film carrier 38 (namely, towards the photographic film 22), light entering the diffusion box 40 becomes slit light having a longitudinal direction in the transverse direction of the photographic film, and exits the diffusion box 40 having been diffused by the light diffusing plate. In this way, due to the fact that light exiting the diffusion box 40 is diffused, unevenness in the amount of light illuminated onto the photographic film 22 is decreased. As a uniform amount of slit light is illuminated onto the film image, even if scratches are present on the film image, the scratches are not obvious.

Figure 16:
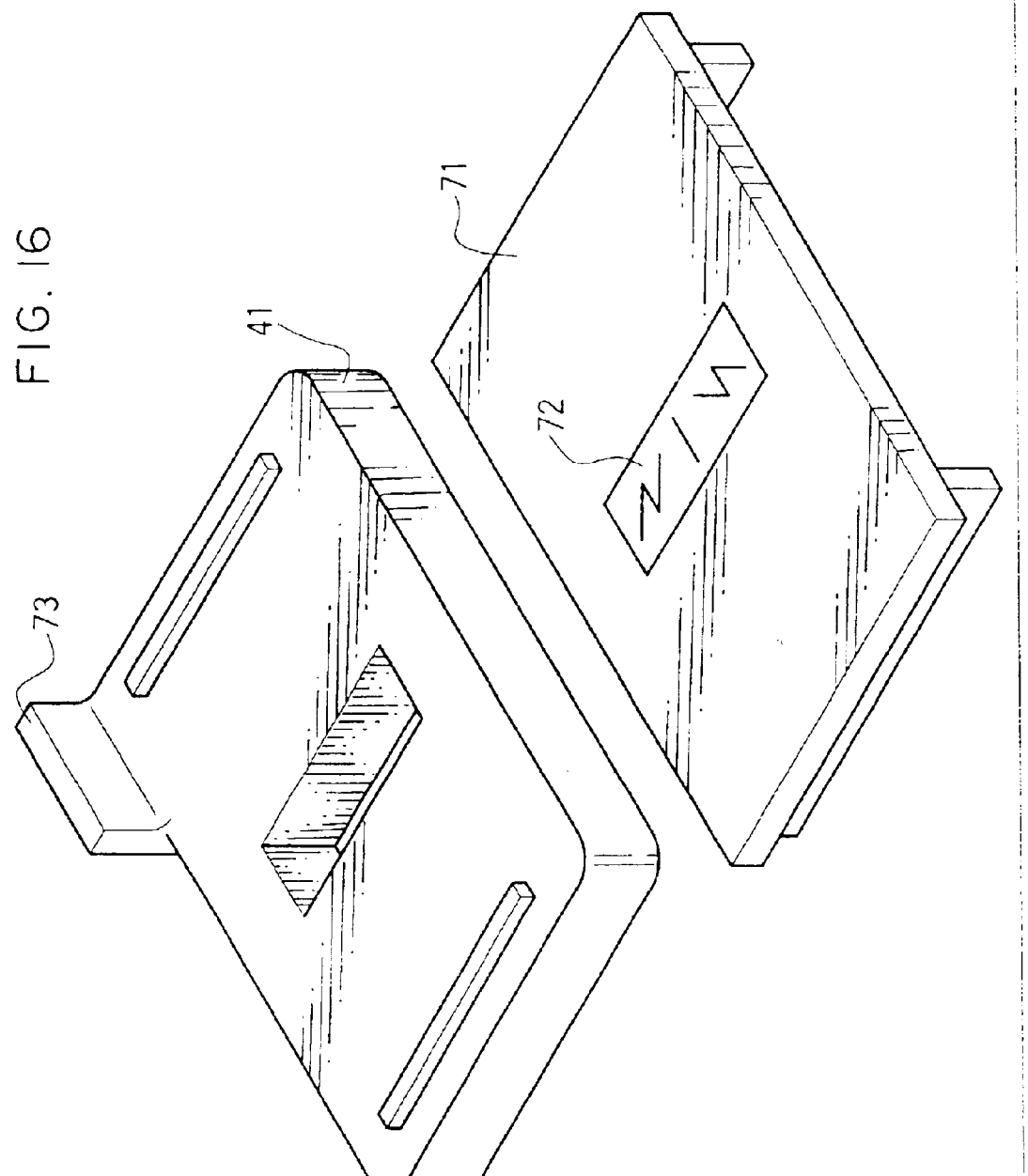
FIG. 16 is an exterior view of a carrier mount and jig.

A film carrier 38 and a diffusion box 40 are prepared for each type of the photographic film 22, are selected in accordance with the photographic film 22, and mounted on the carrier mount 41. Details of the carrier mount 41 are shown in FIG. 16.

At each of respective positions in a top and bottom surface of the film carrier 38 that correspond to the optical axis L, a long and narrow aperture (not illustrated) is provided in the transverse direction of the photographic film 22, such that the length of the aperture is longer than the width of the photographic film 22. The slit light from the diffusion box 40 is illuminated onto the photographic film 22 via the aperture provided at the bottom surface of the film carrier 38, and is transmitted through the photographic film 22 to be illuminated onto the reading section 43 via the aperture provided at the top surface of the film carrier 38.

Further, a guide (not shown) is formed at the film carrier 38, the guide guiding by curving the photographic film 22 such that a region along the transverse direction of the photographic film in a position (reading position) illuminated by the light in the form of a slit from the diffusion box 40 becomes linearly indented or recessed. As a result, it is ensured that the photographic film 22 is a flat plane at the reading position.

Further, the diffusion box 40 is supported so that the top surface thereof is proximal to the reading position. A notch portion through which the diffusion box 40 can enter is provided at the bottom surface of the film carrier 38, so that the film carrier 38 and the diffusion box 40 do not interfere with each other when the film carrier 38 is loaded.

Further, the film carrier conveys a photographic film at a first speed during pre-scanning, and conveys the photographic film at a second speed, which is slower than the first speed, during fine-scanning. As a result, resolution during fine-scanning is better than resolution during pre-scanning. Density and size and the like of each of the film images is detected with data obtained during pre-scanning, and based on such data, reading conditions during fine-scanning, namely, conditions determining the light amount to be illuminated onto the film and the duration of charge storage of the CCD are computed. While the photographic film is conveyed at the fixed second speed during fine-scanning, the stop 39 is controlled so that in accordance with the reading conditions, an amount of light corresponding to the density of the film image is illuminated, and the duration of charge storage of the CCD is controlled.

The image reading section 43 is disposed so as to be contained inside a casing 44. A loading stand 47 is provided at an internal portion of the casing 44, the loading stand 47 having a line CCD 116 attached to an upper surface thereof.

Figure 7:
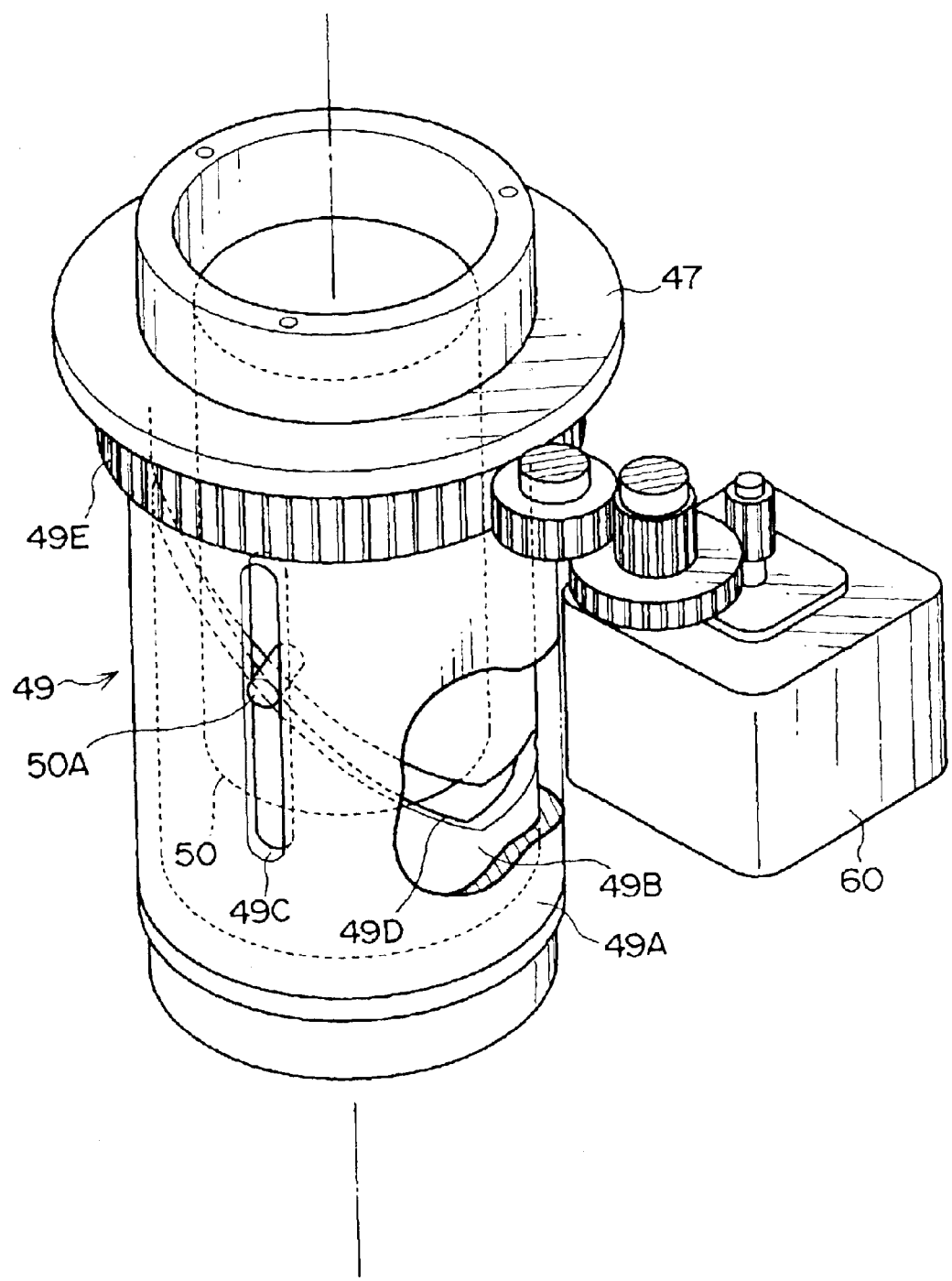
FIG. 7 is an exterior view of an image reading section of the image reading apparatus.

As shown in FIG. 7, an external cylinder 49A is fixed at the loading stand 47, the external cylinder 49A forming a lens-barrel 49 and having cut thereinto two long apertures 49C, which extend in a direction of a line parallel to the optical axis L and which face each other. Inside the external cylinder 49A, an internal cylinder 49B is disposed so as to be rotatable. The internal cylinder 49B has cut thereinto two spiral-shaped long apertures 49D, which face each other. A ring-shaped gear 49E is fixed at an outer periphery end portion of the internal cylinder 49B at the loading stand 47 side. This gear 49E meshes with a gear fixed at a rotational axis of a lens motor 60, via a series of gears.

Two rods 50A are fixed at a lens unit 50, so as to face each other. The lens unit 50 has a focal distance $f_j$. Each of these rods 50A is inserted so as to pass through the respective long aperture 49D and 49C.

Accordingly, when the lens motor 60 is driven to rotate, the internal cylinder 49B rotates, and the rods 50A move along the long apertures 49C, due to the spiral-shaped long apertures 49D. As a result, the lens unit 50 is slid in a direction of the optical axis L, namely, in the directions of arrow A, so as to near or move away from the work table 27, for adjusting the magnification (e.g., reduction, enlargement).

A support frame 45 is arranged in a standing condition at the work table 27. The reading section 43 is meshed with a guide rail 42 which is attached to this support frame 45 and is provided with a ball screw. The reading section 43 is supported so as to be slidable in the directions of arrow B so as to move toward and away from the work table 27 along the guide rail 42, by driving a conjugate length motor 58 which has meshed with the guide rail 42. This reading section 43 is moved during autofocusing, when the conjugate length is adjusted. The lens unit 50 is comprised of plural lenses, and an aperture 51 (lens diaphragm) is provided between the plural lenses.

Figure 4C:
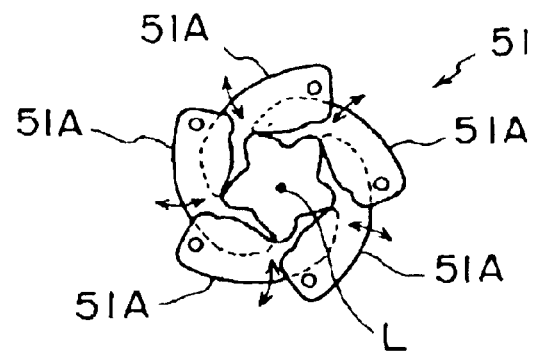
FIG. 4C is a plan view illustrating an example of an lens diaphragm.

As indicated in FIG. 4C, the aperture stop 51 is provided with a plurality of stop plates 51A (diaphragm plates), which are each formed in a substantially C-shaped configuration. The stop plates 51A are disposed evenly around the periphery of the optical axis L. An end portion of each of the stop plates 51A is axially supported so as to be rotatable about a pin. When driving force from an aperture stop driving motor (to be described later) is transmitted thereto, each of the stop plates 51A rotate in the same direction. Together with this rotation of the stop plates 51A, the area of a portion (the substantially star-shaped portion in FIG. 4C), which is not cut off from light by the stop plates 51A and which has as the center the optical axis, changes. As a result, the amount of light that passes through the aperture stop 51 changes.

In the line CCD 116, sensing portions are provided, at which are disposed: a plurality of CCD cells provided in a line along the transverse direction of the photographic film 22, which CCD cells are structured by photoelectric converting elements such as photodiodes or the like; and electronic shutter mechanisms. These sensing portions are provided in three parallel lines spaced apart from each other, and a color separating filter of R, G, or B is mounted to the light-incident side of each of the sensing portions. Namely, the line CCD 116 is a 3-line color CCD formed with a R-line sensor, a G-line sensor, and a B-line sensor. Further, plural transmitting portions are provided in vicinities of each of the sensing portions so as to correspond to the sensing portions. The charge accumulated in each CCD cell of the sensing portions is transmitted sequentially via the corresponding transmitting portion.

Figure 4D:
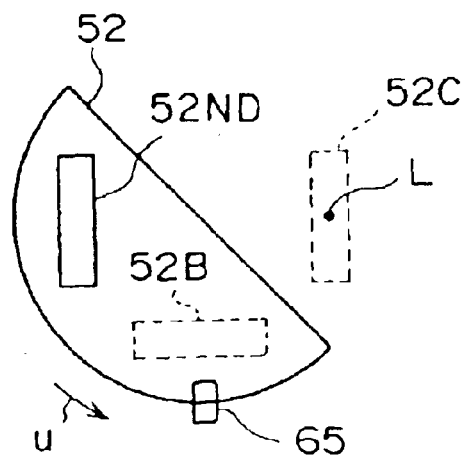
FIG. 4D is a plan view illustrating an example of a CCD shutter.

A CCD shutter 52 is provided at the light-incident side of the line CCD 116. As illustrated in FIG. 4D, an ND filter 52ND is fitted into the CCD shutter 52. The CCD shutter 52, which rotates in the direction of arrow u, switches to one of: a completely closed state (a portion 52B or the like, where the ND filter 52ND is not fitted, is positioned at a position 52C, which contains the optical axis L), in which the CCD shutter 52 blocks light which would otherwise be incident on the line CCD 116 for dark correction; a completely open state (the position of FIG. 4D), in which the CCD shutter 52 allows light to be incident onto the line CCD 116 for regular reading and for light correction and; and a reduced light state (the ND filter 52ND is positioned at the position 52C), in which the light to be incident on the line CCD 116 is reduced by the ND filter 52ND for linearity correction.

A compressor 94, which generates cooling air to cool the photographic film 22, is provided at the work table 27, as illustrated in FIG. 3. The cooling air generated by the compressor 94 is supplied to a reading position (not illustrated) of the film carrier 38, via a guide duct 95. As a result, a region including the reading position for the photographic film 22 can be cooled. Further, a flow rate sensor 96, for detecting the flow rate of the cooling air, is attached to the guide pipe 95.

Figure 5:
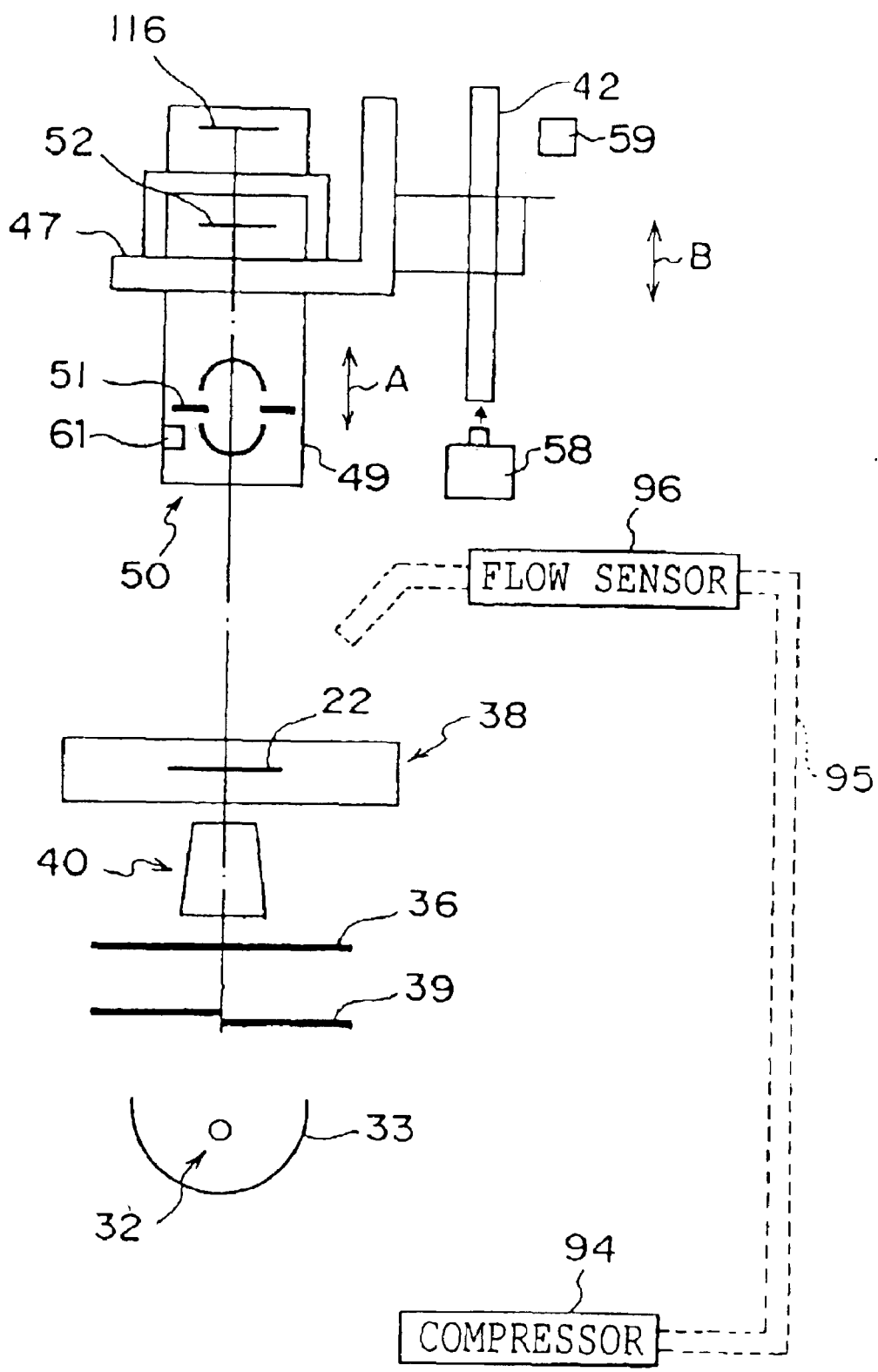
FIG. 5 is a diagram illustrating main portions of the optical system of the image reading apparatus.
Figure 6:
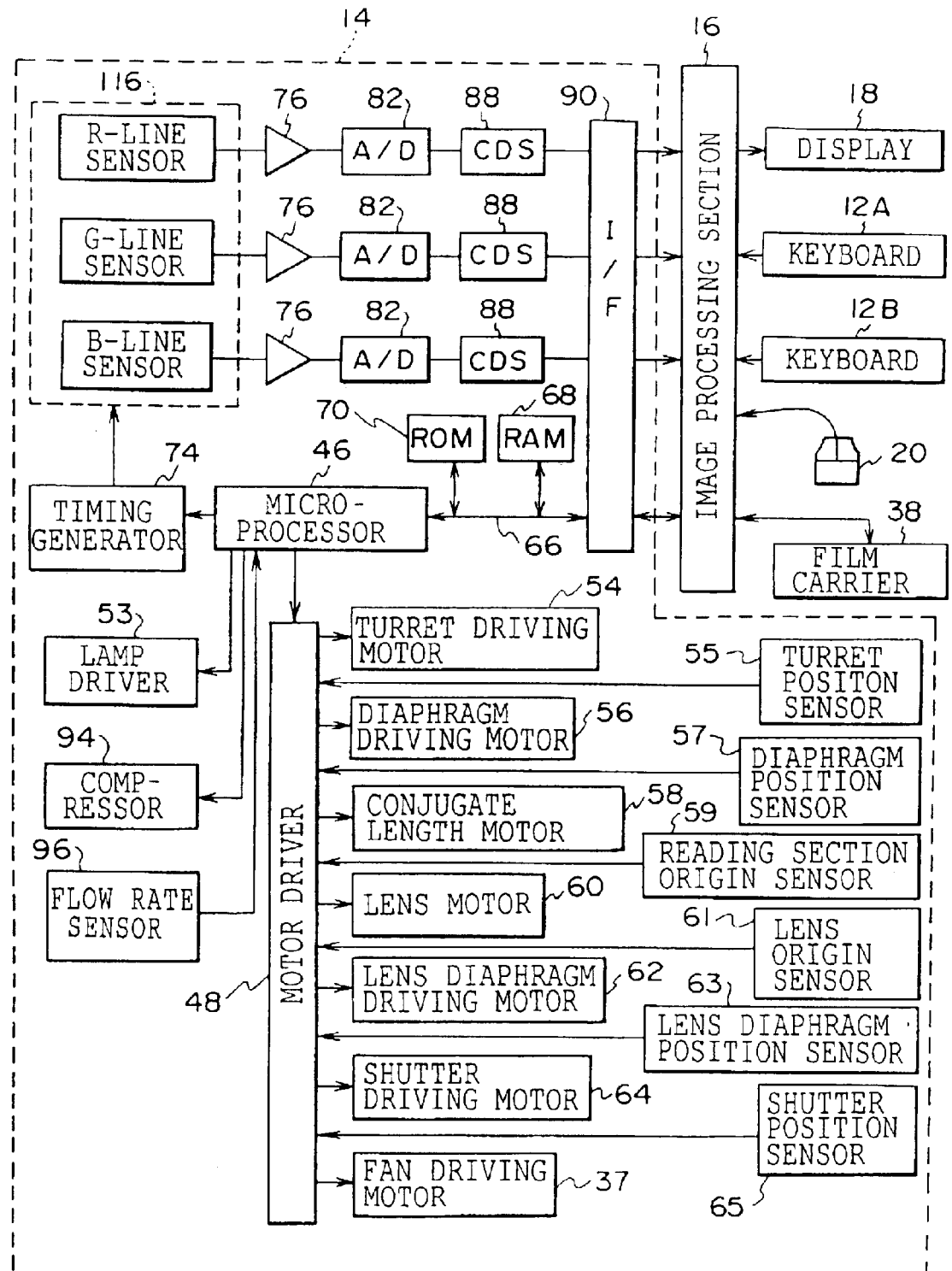
FIG. 6 is a block diagram illustrating a schematic structure of an electrical system of the image reading apparatus.

Further, as illustrated in FIG. 5, a reading section starting point sensor 59, for detecting the starting point position of the reading section 43, is attached at the vicinity of the guide rail 42. A lens starting point sensor 61, for detecting the starting point position of the lens unit 50, is attached at the lens-barrel 49.

Next, while referring to main portions of the optical system of the line CCD scanner 14 illustrated in FIG. 5, the schematic structure of the electric system of the line CCD scanner 14 and the image processing section 16 will be explained.

The line CCD scanner 14 has a microprocessor 46 which governs the overall control of the line CCD scanner 14. A RAM 68 (e.g., an SRAM) and a ROM 70 (e.g., a ROM whose stored contents are rewritable) are connected to the microprocessor 46 via a bus 66. A lamp driver 53, the compressor 94, the flow rate sensor 96, and a motor driver 48 are connected to the microprocessor 46. The lamp driver 53 turns the lamp 32 on and off in accordance with instructions from the microprocessor 46.

When a film image of the photographic film 22 is being read, the microprocessor 46 operates the compressor 94 to supply cooling air to the photographic film 22. The flow rate of the cooling air is detected by the flow rate sensor 96, and the microprocessor 46 senses abnormalities.

A turret driving motor 54 and a turret position sensor 55 (see FIG. 4B) are connected to the motor driver 48. The turret driving motor 54 drives the turret 36 to rotate in the direction of arrow t of FIG. 4B such that either of the balance filter 36N for negative films or the balance filter 36P for reversal films of the turret 36 is positioned on the optical axis L. The turret position sensor 55 detects a reference position (an unillustrated notched portion) of the turret 36. Also connected to the motor driver 48 are a stop driving motor 56 for sliding the stop 39, a stop position sensor 57 which detects the position of the stop 39, a conjugate length motor 58 which comprises a step motor and which slides the reading section 43 (i.e., the line CCD 116 and the lens unit 50) along the guide rail 42, the reading section starting point sensor 59 for detecting the starting position (origin) of the reading section 43, the lens motor 60 which comprises a step motor and which slides the lens unit 50 along the optical axis L, the lens position starting point (origin) sensor 61 for detecting the starting point position of the lens unit 50, an aperture stop driving motor 62 for rotating the stop plates 51A of the aperture stop 51, an aperture stop position sensor 63 for detecting the position of the aperture stop 51 (the positions of the stop plates 51A), a shutter driving motor 64 for switching the CCD shutter 52 to one of the completely closed state, the completely open state, and the reduced-light state, a shutter position sensor 65 for detecting the position of the shutter, and a fan driving motor 37 for driving the fans 34.

When pre-scanning (preliminary reading) and fine scanning (actual reading) are carried out by the line CCD 116, on the basis of the positions of the turret 36 and the stop 39 respectively detected by the turret position sensor 55 and the stop position sensor 57, the microprocessor 46 rotates the turret 36 by the turret driving motor 54 and slides the stop 39 by the stop driving motor 56 so as to adjust the light illuminated onto the film image.

The microprocessor 46 determines the focusing magnification in accordance with the size of the film image, whether trimming is to be carried out, and the like. The microprocessor 46 slides the reading section 43 by the lens motor 60 on the basis of the starting point of the lens unit, which is detected by the lens starting point sensor 61, so that the film image is read by the line CCD 116 at the determined focusing magnification. Further, the microprocessor 46 slides the reading section 43 by the conjugate length motor 58 on the basis of the position of the reading section 43, which is detected by the reading section starting point sensor 59, to carry out autofocusing.

When carrying out focusing control to make the light-receiving surface of the line CCD 116 coincide with the film image focusing position by the lens unit 50 (i.e., when autofocusing control is carried out), the microprocessor 46 slides only the reading section 43 by the conjugate length motor 58. This focusing control can be carried out such that, for example, the contrast of the film image read by the line CCD 116 is a maximum (what is known as the image contrast method). Alternatively, a distance sensor which measures by infrared rays or the like the distance between the photographic film 22 and the lens unit 50 (or the line CCD 116) may be provided, and focusing control can be carried out on the basis of the distance detected by the distance sensor instead of on the basis of the data of the film image.

A timing generator 74 is connected to the line CCD 116. The timing generator 74 generates various types of timing signals (clock signals) for operating the line CCD 116, an A/D converter 82 (which will be described later) and the like. The signal output terminal of the line CCD 116 is connected to the A/D converter 82 by an amplifier 76. The signal outputted from the line CCD 116 is amplified by the amplifier 76 and is converted into digital data at the A/D converter 82.

The output terminal of the A/D converter 82 is connected to the image processing section 16 via a correlation double sampling circuit (CDS) 88 and an interface (I/F) circuit 90 in that order. At the CDS 88, feedthrough data which expresses the level of a feedthrough signal and pixel data expressing the level of a pixel signal are respectively sampled, and the feedthrough data is subtracted from the pixel data for each pixel. The results of calculation (pixel data which accurately corresponds to the amount of accumulated charge in each CCD cell) are output successively to the image processing section 16 via the I/F circuit 90 as scan image data.

Because the R, G, B photometric signals are outputted in parallel from the line CCD 116, three signal processing systems, each having an amplifier 76, an A/D converter 82 and a CDS 88, are provided. The R, G, B image data which is the scan image data are inputted in parallel from the I/F circuit 90 to the image processing section 16.

Further, the image processing section 16 is connected to the display 18, the keyboards 12A, 12B, the mouse 20 and the film carrier 38.

Formula (1) and formula (2) given below are for calculating each of the number of driving pulses $KSP_m$ for the conjugate length motor 58 and the number of driving pulses $LSP_m$ for the lens motor 60 in accordance with each of the setting magnifications m (for example, 0.7, 1.0, 1.5 and the like). Formula (1) and formula (2) are recorded in the ROM 70 of the image reading apparatus, in which reading and writing is possible before shipment from the factory. Further, default values KSB, LSB of which are the respective resolutions of the motors (the distance that can be moved with one pulse) are recorded in advance in the ROM 70. Further, the setting magnification m can be set as a different value in accordance with the film size, such as 135-size, APS, Brownie and the like.

$$KSP_m = (K_m - K_o)/KSB - KGO \tag{1}$$

Here, $K_o$ is the conjugate length of the lens unit 50, which has a focal distance $f_j$, when the reading section is positioned at the starting point (origin); KGO is the number of pulses (number of starting point offset pulses) for when the reading section is positioned at the starting point; KSB is the default value of the resolution of the conjugate length motor 58; and $K_m$ is the conjugate length of the lens unit when the setting magnification m is as represented by the following formula (1-1).

$$K_m = (1+m)^2 \cdot f_j/m \tag{1-1}$$

$$LSP_m = (b_o - b_m)/LSB - LGO \tag{2}$$

Here, $b_o$ is the distance from the principal point of the lens when the lens unit is positioned at the starting point to the light-receiving surface of the line CCD; LGO is the number of pulses (number of starting point offset pulses) when the lens unit is positioned at the starting point; LSB is the default value of the resolution of the lens motor 60; $b_m$ is the distance from the principal point of the lens unit to the light receiving surface of the CCD when the setting magnification m is as represented by the following formula.

$$b_m = (1+m) \cdot f_j \tag{2-2}$$

Further, the focal distance $f_j$ when the temperature of the lens unit is T° C. can be calculated by the following formula, where $f_o$ is the focal distance at a reference temperature $T_o$ (for example, 20° C.), and k is the variable coefficient of the focal distance (for example, 0.004).

$$f_j = f_o + k(T - T_o)$$

Next, calibration of the optical magnification of the present embodiment will be explained. This calibration is carried out when the image reading apparatus is shipped out. As a result of this calibration, the actual focusing magnification is made to coincide with the planned value, and an error in mechanical attachment is canceled by an offset of setting pulses, thereby correcting moving resolution in the direction of the optical axis.

The calibration of the optical magnification is carried out automatically after optical axis adjustment for making the optical axis of the optical system coincide with the center of the line CCD, and after reading position adjustment for adjusting the position of the carrier mount 41 such that the position of the film carrier 38 which is the original holding portion coincides with the line CCD position. The amount of positional offset of the carrier mount 41 from the line CCD is detected by the line CCD reading an image of a chart original 72, which is disposed at the original reading position, using a jig 71 having the chart original 72 held at a surface thereof, as shown in FIG. 16. The reading position adjustment is carried out in accordance with the detected amount of positional offset. Further, the chart original 72 is formed by a glass plate, with a chart pattern recorded thereon. The chart pattern is recorded on the glass plate by carrying out etching thereon.

Figure 11:
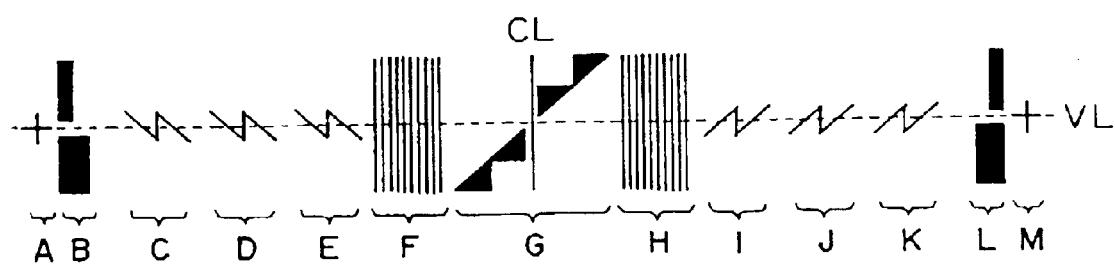
FIG. 11 is a plan view illustrating a chart pattern.

First, the chart pattern used in the detection of the amount of positional offset will be described. As illustrated in FIG. 11, in the chart pattern used in the present embodiment, a plurality of patterns are formed symmetrically at the left and the right of a pattern G positioned at the center. (In the present embodiment, there are 13 patterns A through M.) In FIG. 11, the dashed line represents a first imaginary line VL which corresponds to the direction in which the line CCD cells are arrayed (the CCD line direction) when the chart original 72 is set at the original reading position. The patterns F and H, the patterns E and I, the patterns D and J, the patterns C and K, the patterns B and L, and the patterns A and M are disposed so as to be spaced apart at predetermined distances symmetrically with respect to a central line CL which forms a part of the pattern G.

Figure 12:
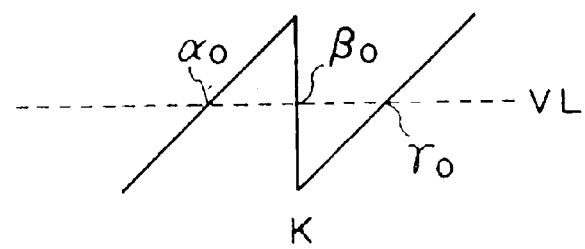
FIG. 12 is an enlarged view of a chart K of the chart pattern.

As illustrated in FIG. 12, the patterns C, D, E, I, J, K (hereinafter referred to as the "N-shaped patterns") are formed from a first line segment which is perpendicular to the imaginary line VL, and two second line segments which intersect the first line segment at 45° at the end portions of the first line segment and are oriented in respectively opposite directions with respect to the first line segment. The N-shaped pattern and the imaginary line VL intersect at three points $\alpha_0$, $\beta_0$, and $\gamma_0$. The distance between $\alpha_0$ and $\beta_0$ and the distance between $\beta_0$ and $\gamma_0$ are equal.

Next, the method of detecting the positional offset by using the jig 71 having the chart original 72 held at the surface thereof will be described.

When the optical axis adjustment of the optical system and the line CCD is completed, the jig 71 having the chart original 72 held at the surface thereof is made to abut against the standard abutting surface of the carrier mount 41 so as to be set on the carrier mount 41. The chart pattern of the chart original 72 is read by the line CCD. Because the film is conveyed perpendicularly to the line CCD, the conveying direction will be called the left-and-right direction and the CCD line direction will be called the front-and-back direction. The jig 71, which has the chart original 72 held at the surface thereof, is set such that the CCD line direction, i.e., the front-and-back-direction, is the longitudinal direction of the chart pattern (the direction of the first imaginary line).

Figure 14:
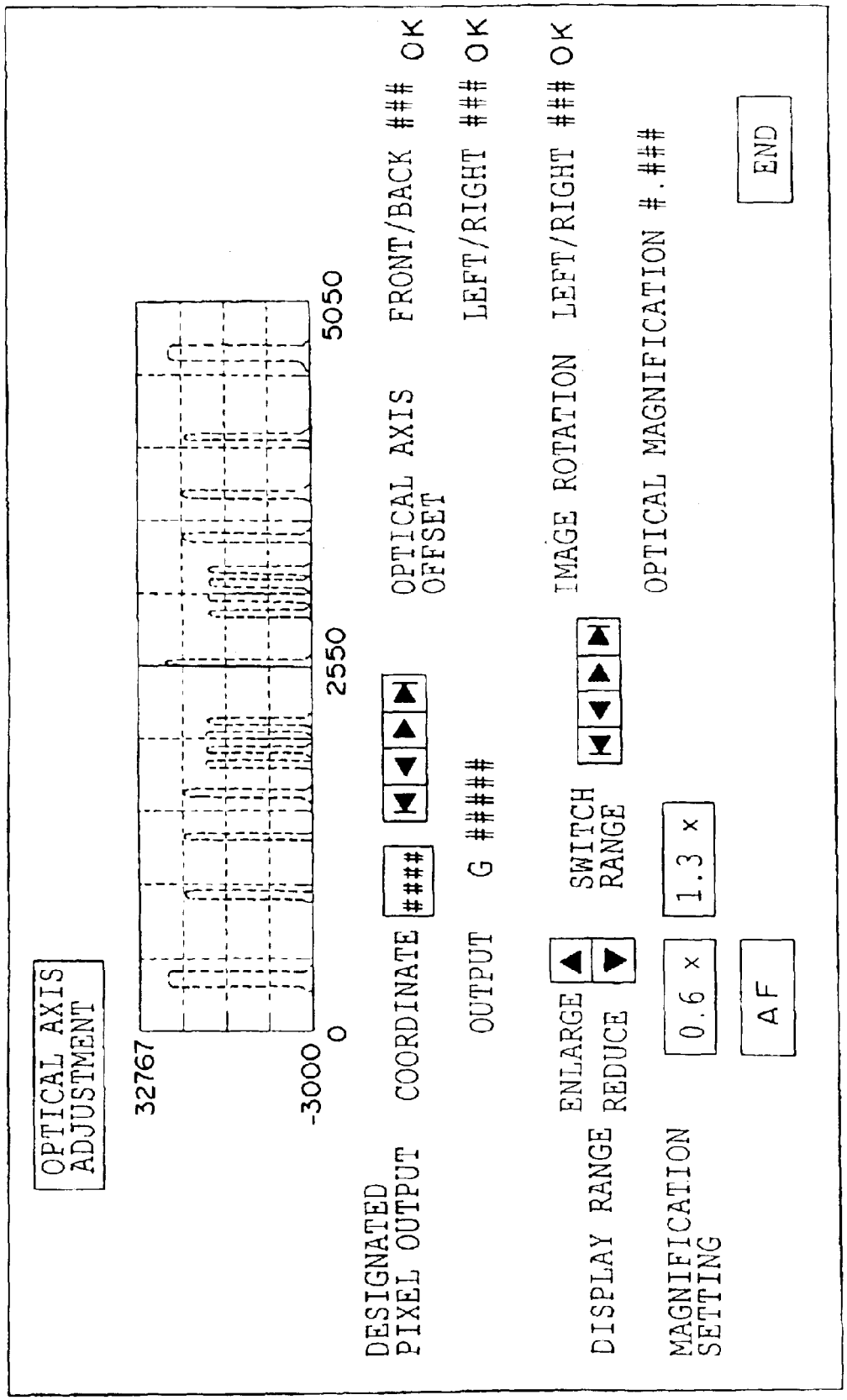
FIG. 14 is a plan view illustrating a display screen of a read chart pattern and a detected amount of positional offset.

As illustrated in FIG. 14, the read chart pattern is displayed on a display 18. The amount of positional offset, which expresses by how much the imaginary line VL of the chart pattern is offset from the CCD line direction, is detected, and is displayed on the screen together with the read chart pattern.

For example, the amount of positional offset of the imaginary line VL in the front-and-back direction (i.e., the offset of the center line of the pattern G from the optical axis) is detected by using the pattern G, and a display such as "front/back ###" is effected. Further, for example, by using pattern C and pattern K which are a pair of symmetrically disposed N-shaped patterns, the amount of positional offset, in the left-and-right direction, of the imaginary line VL with respect to the CCD line direction, and the amount of positional offset, in the rotational direction around the optical axis, of the imaginary line VL with respect to the CCD line direction are detected, and a display such as "left/right ###" is effected.

Here, the principles of detection of the amount of positional offset using a pair of symmetrically disposed N-shaped patterns will be briefly explained. FIG. 15A is a projected image of the pattern E and the pattern I in a case in which the carrier mount 41 is at the proper reading position and the imaginary line VL coincides with the CCD line direction. The display pattern shown on the display at this time is schematically illustrated in FIG. 15B. The points of intersection of the respective patterns with the CCD line direction are $\alpha$, $\beta$, and $\gamma$, and for each pattern, the distance between $\alpha$ and $\beta$ and the distance between $\beta$ and $\gamma$ are equal. Further, the distance between $\alpha$ and $\beta$ at pattern E and at pattern I are equal, and the distance between $\beta$ and $\gamma$ at pattern E and at pattern I are equal.

If the carrier mount 41 is offset toward the right from the proper reading position, the CCD line direction is offset toward the left with respect to the chart original 72 which is held at the jig 71. As illustrated in FIG. 15D, in accordance with the amount of offset of the CCD line direction, the distance between $\alpha$ and $\beta$ increases and the distance between $\beta$ and $\gamma$ decreases. Conversely, if the carrier mount 41 is offset toward the left from the proper reading position, the CCD line direction is offset toward the right. As illustrated in FIG. 15C, in accordance with the amount of offset of the CCD line direction, the distance between $\alpha$ and $\beta$ decreases and the distance between $\beta$ and $\gamma$ increases. Accordingly, the amount of offset of the carrier mount 41 in the left-and-right direction can be calculated from the ratio of the distance between $\alpha$ and $\beta$ and the distance between $\beta$ and $\gamma$.

If the carrier mount 41 is rotated toward the right from the proper reading position, the CCD line direction is rotated toward the left. As illustrated in FIG. 15F, at pattern E, the distance between $\alpha$ and $\beta$ decreases and the distance between $\beta$ and $\gamma$ increases in accordance with the amount of rotation of the CCD line direction, whereas at pattern I, the distance between $\alpha$ and $\beta$ increases and the distance between $\beta$ and $\gamma$ decreases in accordance with the amount of rotation of the CCD line direction. Conversely, if the carrier mount 41 is rotated toward the left from the proper reading position, the CCD line direction is rotated toward the right. As illustrated in FIG. 15E, at pattern E, the distance between $\alpha$ and $\beta$ increases and the distance between $\beta$ and $\gamma$ decreases in accordance with the amount of rotation of the CCD line direction, whereas at pattern I, the distance between $\alpha$ and $\beta$ decreases and the distance between $\beta$ and $\gamma$ increases in accordance with the amount of rotation of the CCD line direction. Accordingly, the amount of offset of the carrier mount 41 in the rotational direction can be calculated from the ratio of the distance between $\alpha$ and $\beta$ and the distance between $\beta$ and $\gamma$ at pattern E, and from the ratio of the distance between $\alpha$ and $\beta$ and the distance between $\beta$ and $\gamma$ at pattern I.

The adjustment of the reading position is carried out in accordance with the detected amount of positional offset of the imaginary line VL from the CCD line direction. For example, if it is displayed that the imaginary line VL is offset ## toward the right, the carrier mount 41 is moved by an amount corresponding to ## in the right direction. If it is displayed that the imaginary line VL is offset #### in a right rotation, the carrier mount 41 is moved by an amount corresponding to #### in a right rotation. The adjustment of the reading position may be carried out manually or automatically. The carrier mount 41 can be moved by moving the jig 71.

As described above, after the optical axis adjustment and reading position adjustment have been carried out, the imaginary line VL coincides with the array direction of the line CCD passing through the optical axis, and the central line CL passes through the optical axis.

Figure 8:
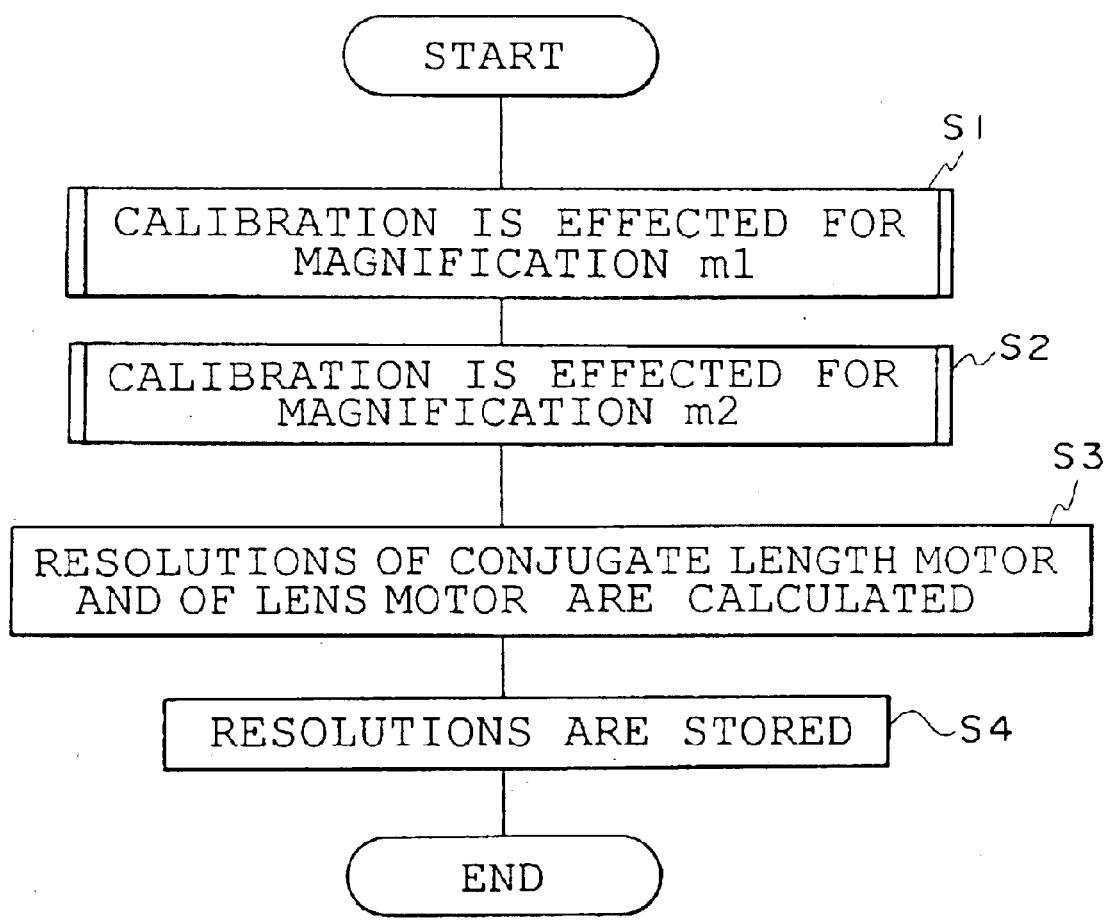
FIG. 8 is a flowchart of a routine through which magnification calibration is executed in accordance with an embodiment of the present invention.

Next, by again using the jig 71, at which the chart original 72 is held at the surface thereof, the chart patterns as shown in FIG. 11 being recorded on the chart original 72, as illustrated in FIG. 8, calibration for the setting magnification m1 (for example, 0.7 times) is effected in step S1, and thereafter, calibration for the setting magnification m2 (for example, 1.0 times) is effected in step S2.

Figure 9:
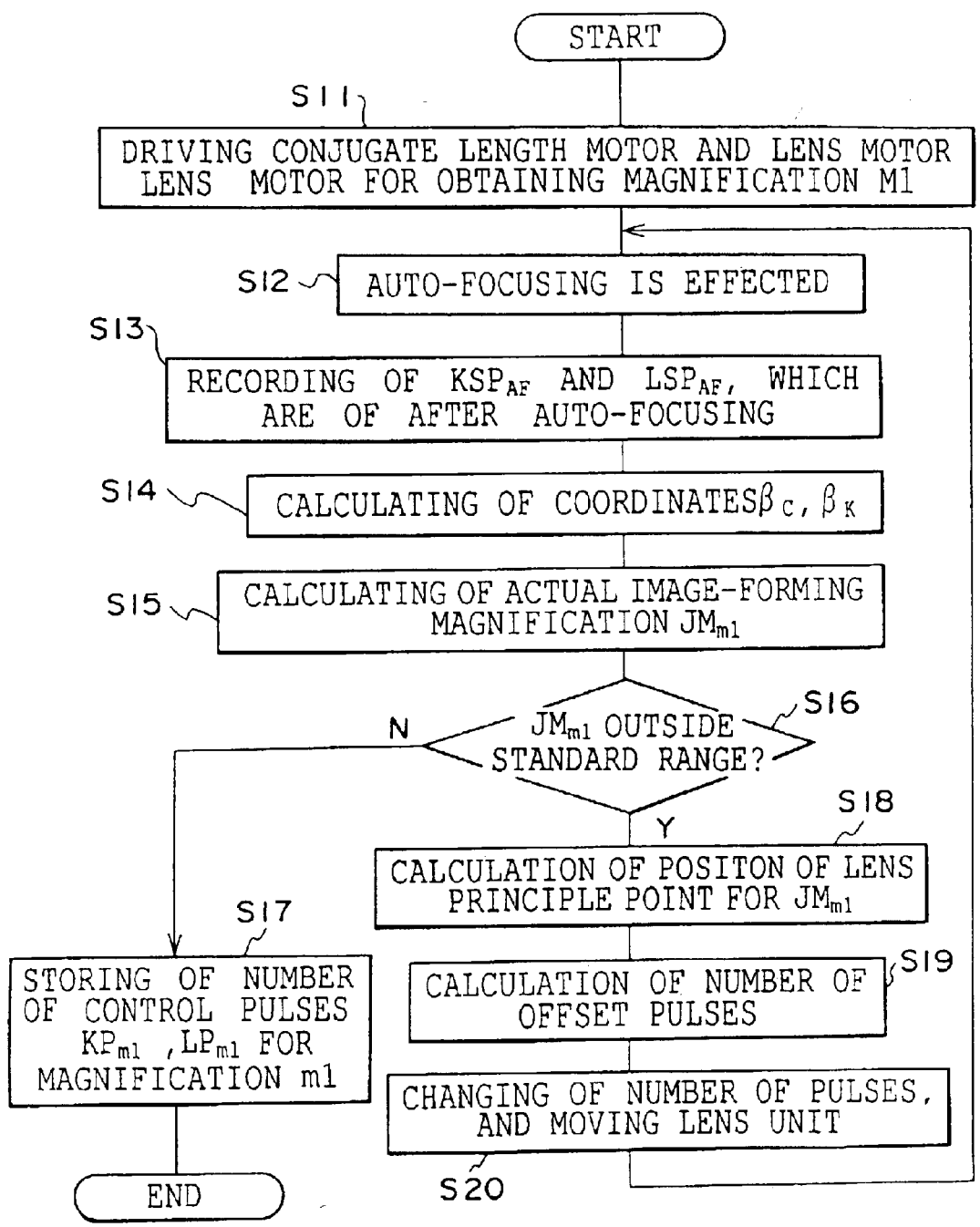
FIG. 9 is a flowchart illustrating details of step S1 in FIG. 8.

First, calibration for the magnification m1 will be explained with reference to FIG. 9. In step S11, the number of setting pulses of the conjugate length motor 58 and the number of setting pulses of the lens motor 60, which are for the magnification m1, are calculated using the formulas (1) and (2) and the default values KSB, LSB recorded in the ROM 70. By driving the motors 58, 60 by the numbers of setting pulses, the lens unit and the reading section are moved to the setting positions.

In step S12, the conjugate length motor is driven so as to focus on the chart pattern based on the output of the G-line sensor, thereby executing autofocusing (AF). In step S13, the number of pulses when the focusing to the chart pattern is done is recorded in the RAM as the number of pulses $KSP_{AF}$ of the conjugate length motor and the number of pulses $LSP_{AF}$ of the lens motor, which are both of after completion of autofocusing. During execution of autofocusing, the lens motor 60 is stopped.

In step S14, position coordinates $\beta_K$ and $\beta_C$, which are at the respective centers of patterns C and K of FIG. 11, are calculated based on output of the G-line sensor, and in step S15, the actual focusing magnification $JM_{m1}$ for the G-line sensor is calculated. As shown in FIG. 12, center coordinates can be represented by the intersection of the horizontal line and a vertical line of the pattern.

$$JM_{m1}=(\beta_K-\beta_C)/BN \qquad (3)$$

Here, BN is the actual distance between the charts C and K.

Subsequently, in step S16, it is determined whether the actual focusing magnification $JM_{m1}$ is outside a standard range, by determining whether the actual focusing magnification $JM_{m1}$ is a value outside a predetermined range on the basis of as a standard the magnification m1.

In cases where the actual focusing magnification $JM_{m1}$ is within the standard range: in step S17, the number of pulses $KSP_{AF}$ of after completion of autofocusing is stored as the number of control pulses $KP_{m1}$ of the conjugate length motor, and the number of pulses $LSP_{AF}$ is stored as the number of control pulses $LP_{m1}$ of the lens motor with respect to magnification m1.

On the other hand, in cases where the actual focusing magnification $JM_{m1}$ is determined to be outside the standard range in step S16: in step S18, for the actual focusing magnification $JM_{m1}$, the distance $b_{JMm1}$ (position of the lens principal point), which is from the principal point of the lens to the light-receiving surface of the line CCD, is calculated. This distance $b_{JMm1}$ is determined in the following way, using the above formulas (1-1) and (2-2).

$$b_{JMm1}=JM_{m1}\cdot K_{JMm1}/(1+JM_{m1})$$

$$\text{Note, } K_{JMm1}=(1+JM_{m1})^2\cdot f_j/JM_{m1} \qquad (4)$$

Subsequently, in step S19, the offset pulses LOP of the lens motor is calculated as follows: the difference between the distance $b_{JMm1}$ for the actual focusing magnification, which distance is from the principal point of the lens to the light-receiving surface of the line CCD, and the distance $b_{m1}$ for the magnification m1, which distance is from the principal point of the lens to the light-receiving surface of the line CCD, is divided by the resolution of the lens motor, as indicated in the following formula.

$$LOP=(b_{JMm1}-b_{m1})/LSB \qquad (5)$$

Subsequently, in step S20, the number of setting pulses $LSP_{m1}$ of the lens motor for the magnification m1 and the offset pulse LOP are added together in order to reset the driving pulses of the lens motor ($=LSP_{m1}+LOP$), and the lens unit is moved. Thereafter, the process returns to step S12, the conjugate length motor is driven and autofocusing is effected again. Steps S12 to S16 are repeatedly executed until it is determined that the actual focusing magnification $JM_{m1}$ falls within the standard range in step S16. As a result, the position of the lens unit can be controlled so that the actual focusing magnification of after autofocusing coincides with the setting magnification.

In cases where the actual focusing magnification $JM_{m1}$ falls within the standard range: as described above, in step S17, the number of pulses $KSP_{AF}$ of after completion of autofocusing is stored as the number of control pulses $KP_{m1}$ of the conjugate length motor, and the number of pulses $LSP_{AF}$ is stored as the number of control pulses $LP_{m1}$ of the lens motor with respect to magnification m1.

Figure 10:
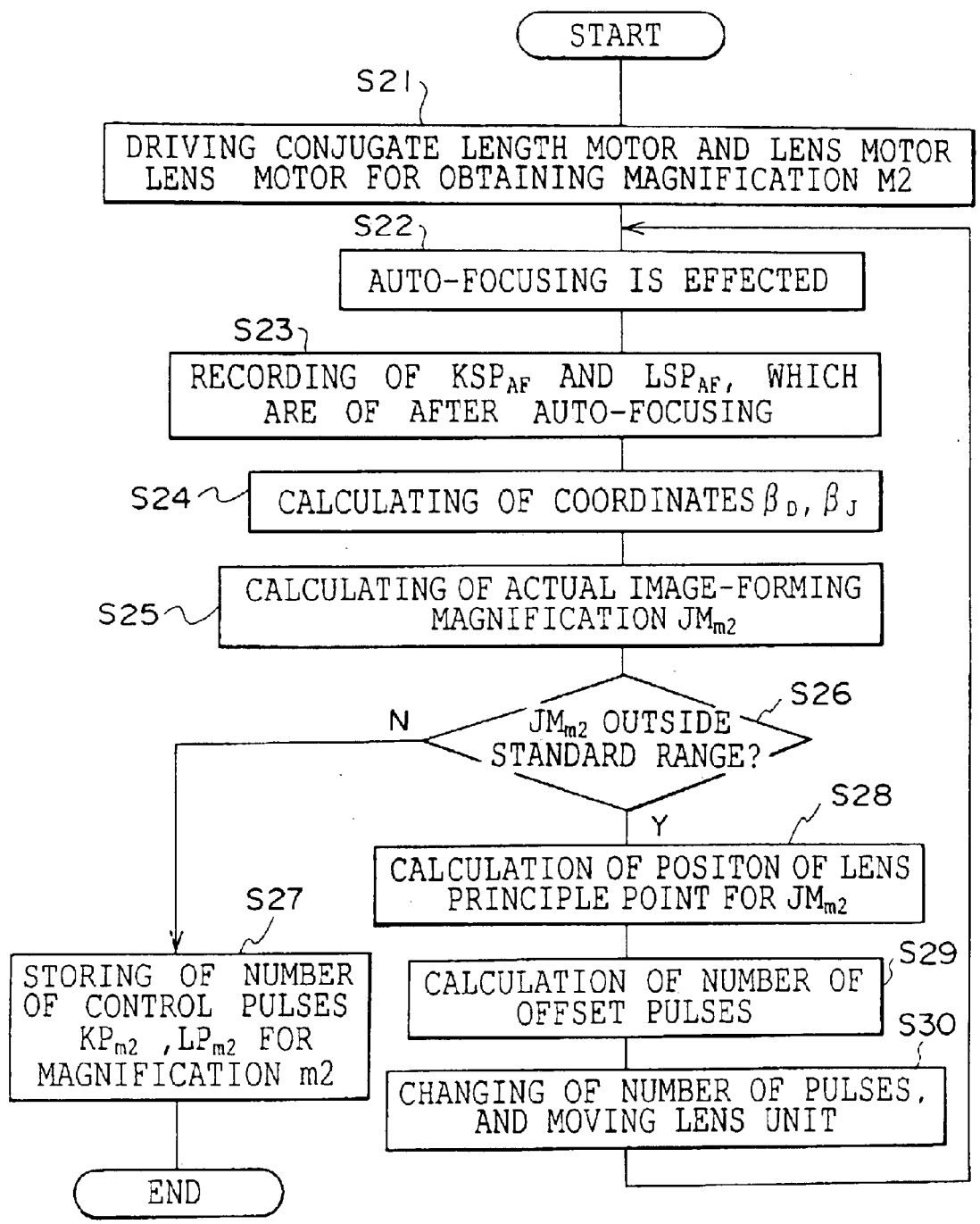
FIG. 10 is a flowchart illustrating details of step S2 in FIG. 8.

Subsequently, calibration for the setting magnification m2 will be described with reference to FIG. 10. In FIG. 10, the magnification is changed from m1 (of FIG. 9) to m2, and position coordinates $\beta_D$ and $\beta_J$, which are the respective centers of patterns D and J, are used to calculate the actual focusing magnification. In other respects, the explanation is the same as that given above for FIG. 9, and so further explanation thereof will be omitted.

In step S3 of FIG. 8, the resolution KJB of the conjugate length motor and the resolution LJB of the lens motor are calculated in accordance with the following formulas, using the difference in the conjugate length between different setting magnifications and the difference in the number of actual measurement pulses between different magnifications.

$$KJB=(K_{m1}-K_{m2})/KP_{m1}-KP_{m2}) \qquad (6)$$

$$LJB=(b_{m2}-b_{m1})/(LP_{m2}-LP_{m1}) \qquad (7)$$

In step S4, the default value KSB of the conjugate length motor is changed to the default value KJB, which is shown in formula (6) calculated as above. In addition, the default value LSB of the lens motor is changed to the default value LJB, which is shown in formula (7) calculated as above. The calibration that is executed in this way is displayed on the display as calibration results, as illustrated in FIG. 13.

Further each of the "#" which appears in FIG. 13 represents numerical values.

Further, the number of setting pulses of after completion of magnification calibration is obtained by the following formulas. In accordance with the following formulas, the number of setting pulses for each of the magnifications is calculated, to govern thereby the conjugate length motor and the lens motor.

conjugate length motor $$KP_m=((1+m)^2 \cdot f_j/m - K_o)/KJB - KGO \qquad (8)$$

lens motor $$LP_m=(b_o-(1+m)\cdot f_j)/LJB - LGO \qquad (9)$$

Above, an example was described in which the default values are adjusted using two setting magnifications. However, instead, the default values may be adjusted using one setting magnification.

When the above-described adjustment is finished, the jig 71 is removed from the carrier mount 41, and adjustment is completed.

Next, a description will be given of a case in which the operator adjusts the print magnification using the above-described image reading apparatus. In the ROM of the image reading apparatus, an electron magnification default value for adjusting the print magnification in accordance with the film size and the print size is recorded. The print magnification is defined as the product of the optical magnification m and the electron magnification, and the print magnification is changed by changing the electron magnification without changing the optical magnification. This electron magnification changes the magnification of the image displayed by enlarging or reducing the image pixels based on image processing.

The image data of the film read by the line CCD is stored in the RAM. Film images based on the image data stored in the RAM are displayed in the display 18. In cases in which the print magnification is adjusted, the operator inputs an adjustment value via the keyboard while viewing the displayed image. As a result, together with the change in the size of the display screen in accordance with the adjustment value, the default value of the electron magnification changes in accordance with the adjustment value. After the default value is adjusted, an image corresponding to the print magnification corresponding to the adjusted default value is displayed on the display 18.

As described above, in accordance with the present invention, an image reading apparatus and a default value adjusting method of an image reading apparatus which reduce the work involved in adjustment are provided. Further, a chart original which facilitates detection of positional offset between an original holding portion and an image reading element is provided.

What is claimed is:

1. A chart original in which two or more patterns are disposed so as to be separated at predetermined intervals and so as to be symmetric with respect to a second imaginary line which is orthogonal to a first imaginary line, each of said patterns being formed from a first line segment, which is orthogonal to the first imaginary line, and two second line segments, which are disposed at opposite positions with respect to the first line segment so as to intersect the first line segment, and the first line segment and the second line segments of each pattern intersecting the first imaginary line at respective three points.

2. A chart original according to claim 1, wherein said chart original is used to detect positional offset between an image reading element and an original holding portion which holds an original at an original reading position, of an image reading apparatus comprising a reading section having the image reading element which reads an image of the original disposed at the original reading position.

3. A chart original according to claim 2, wherein said chart original is to be located at the original reading position of the original holding portion, and read by the image reading element.

4. A chart original according to claim 2, wherein said chart original is set at the original reading position of the original holding portion such that the first imaginary line is oriented in a direction corresponding to a direction in which a plurality of pixels of the image reading element are arrayed.

5. A chart original according to claim 4, wherein the positional offset is detected by detecting the intervals between said three points.

6. A chart original according to claim 1, wherein the chart original is used in an image reading apparatus, and calibration is carried out to set an actual focusing magnification of the image reading apparatus to be a predetermined focusing magnification on the basis of respective positions of two patterns which are symmetrically disposed with respect to the second imaginary line, and a distance between the two patterns which are symmetrically disposed.

* * * * *